(12) United States Patent
Hsu

(10) Patent No.: US 9,346,328 B2
(45) Date of Patent: May 24, 2016

(54) PUNCTURE-PROOF STRUCTURE FOR TIRE

(71) Applicant: Shut Chen Hsu, Yilan County (TW)

(72) Inventor: Shut Chen Hsu, Yilan County (TW)

( * ) Notice: Subject to any disclaimer, the term of this patent is extended or adjusted under 35 U.S.C. 154(b) by 306 days.

(21) Appl. No.: 13/869,449

(22) Filed: Apr. 24, 2013

(65) Prior Publication Data

US 2014/0318679 A1    Oct. 30, 2014

(51) Int. Cl.
*B60C 17/04* (2006.01)

(52) U.S. Cl.
CPC ............ *B60C 17/047* (2013.04); *B60C 17/041* (2013.04)

(58) Field of Classification Search
CPC ...... B60C 17/04; B60C 17/044; B60C 17/06; B60C 17/00; B60C 17/041; B60C 17/047
USPC ................................................... 152/158, 520
See application file for complete search history.

(56) References Cited

U.S. PATENT DOCUMENTS

| | | | |
|---|---|---|---|
| 6,932,131 B1 * | 8/2005 | Hsu | 152/520 |
| 6,983,774 B2 * | 1/2006 | Hsu | 152/520 X |
| 2005/0115656 A1 * | 6/2005 | Hsieh et al. | 152/520 |

\* cited by examiner

*Primary Examiner* — Adrienne C Johnstone
(74) *Attorney, Agent, or Firm* — Rosenberg, Klein & Lee

(57) ABSTRACT

A spare tire body for the tire cavity of run-flat tires comprises: a plurality of circumferentially arranged combining blocks each being a hollow member that has two lateral sides each with a through hole, a bottom, two lengthwise ends on the bottom diagonally formed with projecting portions, and a top formed as an engaging valley; and either a) a C-shaped lining piece and two C-shaped holding pieces or b) a C-shaped lining piece or c) two C-shaped holding pieces or d) a C-shaped lining piece and one C-shaped holding piece. A connecting assembly of two pairs of fine tuning members, an adjusting member, a pressing bolt, a pressing screw bolt, and two reinforcing plates may be provided.

1 Claim, 8 Drawing Sheets

PUNCTURE-PROOF STRUCTURE FOR TIRE

BACKGROUND OF THE INVENTION

1. Technical Field

The present invention relates to an improved puncture-proof structure for tires, which can be rapidly installed into a tire and is adaptive to various tire types by using fine tuning, thereby ensuring driving safety.

2. Description of Related Art

Generally, tires can be categorized into regular tires that have an inner tube therein and tubeless tires without using an inner tube, both of which are not resistant to damages caused by external force. A tire with an inner tube is ready to work when the inner tube is inflated to expand an outer tube of the tire. Upon puncture by a knife or a sharp article, the tire becomes flat and unusable immediately, bringing the driver with much trouble, such as shoving the car. In the case such a tire gets punctured when the car using it is running fast, traffic accidents are likely to happen. On the other hand, tubeless tires are known to be able to defer the tire's complete flatness upon puncture, so as to provide sufficient buffer time for the driver to drive the car to a nearby repair workshop. While this buffering function does allow a driver with a damaged tubeless tire to safely arrive at a repair workshop, this function can also hinder a car driver from immediately noticing the tire damage as the tire pressure does not drop sharply. In this case, if the car driver not aware of the tire damage drives his/her car in high speed or on a rugged road, the tire is likely to become unusable immediately and put the driver into the risk of a traffic accident that endangers his/her life.

In view of the shortcomings of the prior-art devices, the present inventor is concerned about the public traffic safety and has invented numerous novel tire improvements, including many that have been patented in many countries. Nevertheless, instead of being complacent about his achievements, the inventor continues to research and improve his patented inventions (as the inventor owns numerous applications and patents, the list is too long to name here), and herein provides further improved simplified structure that can be assembled rapidly in order to benefit the public in terms of driving safety.

BRIEF SUMMARY OF THE INVENTION

The present invention is directed to an improved puncture-proof structure for tires. Particularly, the improved puncture-proof structure provides a spare tire body that can be installed to a tire rapidly and is applicable to various tire types by using fine tuning. The spare tire body makes a tire using the same puncture-proof. The tire has its two top inner edges formed with hooked portions for engaging with the spare tire body made of serially connected combining blocks. When the tire gets punctured and damaged by a knife or a sharp article, the spare tire body allows the tire to keep work safely. Therein, the spare tire body is a C-shaped member composed of plural combining blocks, plural C-shaped holding pieces and a C-shaped lining piece. It can be engaged with the hooked portions of the tire rapidly and arm the tire with puncture-proof ability.

The objective of the present invention is to provide such an improved puncture-proof structure, wherein the preassembled spare tire body is a C-shaped part that can be directly engaged with the hooked portions of the tire, thereby achieving rapid installation. Besides, a tire using the spare tire body is puncture-proof such that when punctured by sharp articles or knifes, the tire can still work to make safe arrival at a nearby repair workshop. This saves a car driver who has a flat tire from shoving the car along a high-traffic road and risking his/her life, thereby ensuring the public traffic safety. In one embodiment, a spare tire body for the tire cavity of run-flat tires has a plurality of combining blocks. Each combining block is a hollow member that has two lateral sides thereof each provided with a through hole, a bottom thereof, and a top thereof formed as an engaging valley. Each combining block hasg two lengthwise ends thereof located on the bottom. Each lengthwise end is formed with a projecting portion. The projecting portion of the first lengthwise end is on the first lateral side and the projecting portion of the second lengthwise end is on the second lateral side. Each lateral side has an engaging rib formed above its through hole. The spare tire body for the tire cavity of run-flat tires also has two C-shaped holding pieces each having a C-shaped body formed with plural through holes and notches; and a C-shaped lining piece having a C-shaped body formed with plural through holes. The C-shaped lining piece is inserted into a series of the hollow combining blocks so that the through holes of the C-shaped lining piece are aligned with the through holes of the combining blocks, respectively. The two C-shaped holding pieces each have the through holes thereof aligned with the through holes at the two sides of the series of the combining blocks, so that screw bolts passing through the through holes of the C-shaped lining piece, the C-shaped holding pieces, and the series of the combining blocks hold together the C-shaped lining piece, the two-C-shaped holding pieces, and the series of the combining blocks to form a C-shaped spare tire body, in which the engaging ribs at the two sides of the series of the combining blocks are fittingly received by the notches of the C-shaped holding pieces.

The spare tire body also has two pairs of fine tuning members with each fine tuning member having a lengthwise body formed with plural receiving holes and a propping plate extended from an upper edge of the lengthwise body; an adjusting member being a lengthwise piece that has one end formed with one receiving hole and an opposite end formed with plural indentations; and a pressing shaft being an axle received in the through holes of a first additional one of the plurality of combining blocks, having two ends thereof formed with threaded holes, and having a through hole running radially therethrough.

The spare tire body also has a pressing bolt that is an axle passing through the through holes provided on a second additional one of the plurality of combining blocks, having two ends thereof formed with threaded holes, and having a threaded retaining hole running radially therethrough; a pressing screw bolt being provided with plural positioning holes; and two reinforcing plates each being a lengthwise piece provided with separated locking holes. The two additional ones of the plurality of combining blocks are positioned between the series combining blocks at the two ends of the C-shaped spare tire body so that all of the engaging valleys are circumferentially aligned. When the engaging valleys of all of the combining blocks of the spare tire body are engaged with hooked portions of the tire inside the tire cavity, the through holes of the series combining blocks at the two ends of the C-shaped spare tire body and the through holes of the C-shaped holding pieces and of the C-shaped lining piece are aligned with the receiving holes of the two pairs of fine tuning members. One of the respective pair of fine tuning members is on one lateral side of the respective series end combining block and the other one of the respective pair of fine tuning members is on the other lateral side of the respective series end combining block, so that screws pass through these holes and hold together the series end combining blocks, the C-shaped holding piece, the C-shaped lining piece and the fine tuning members. One of the two pairs of the fine tuning members connecting the two additional ones of the plurality of combining blocks with the two ends of the C-shaped spare tire body has the receiving holes thereof each aligned with a threaded hole of the pressing shaft fixedly held by the through holes of the first additional one of the plurality of combining blocks. The other of the two pairs of the fine tuning members connecting the two additional ones of the plurality of combining blocks with the two ends of the C-shaped spare tire body has the receiving holes thereof each aligned with a threaded hole of the pressing bolt fixedly held by the through holes of the second additional one of the plurality of combining blocks, the through hole of the pressing shaft receiving the pressing screw bolt, and the threaded retaining hole of the pressing bolt screwedly receiving the pressing screw bolt passing through the through hole of the pressing shaft, so that by screwing the pressing screw bolt in or out with respect to the threaded retaining hole. The spare tire body is finely tuned to be fittingly engaged with the hooked portions of the tire, the adjusting member and the two reinforcing plates straddling on the fine tuning members such that the receiving hole and the indentations of the adjusting member and the locking holes of the reinforcing plates are aligned with the receiving holes of the fine tuning members, screw bolts being inserted into the threaded holes of the pressing shaft and the pressing bolt to hold together the adjusting member, the two reinforcing plates and the fine tuning members, so that one of the screw bolts props against one of the positioning holes of the pressing screw bolt to prevent the pressing screw bolt from loosening Also, the propping plates of the fine tuning members adjacent to the adjusting member prop against the adjusting member to prevent the adjusting member from loosening The plural receiving holes of the fine tuning members and the plural indentations of the adjusting member provide different combined distances for optional use in order to make the spare tire body fittingly engaged with the hooked portion of the tire.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
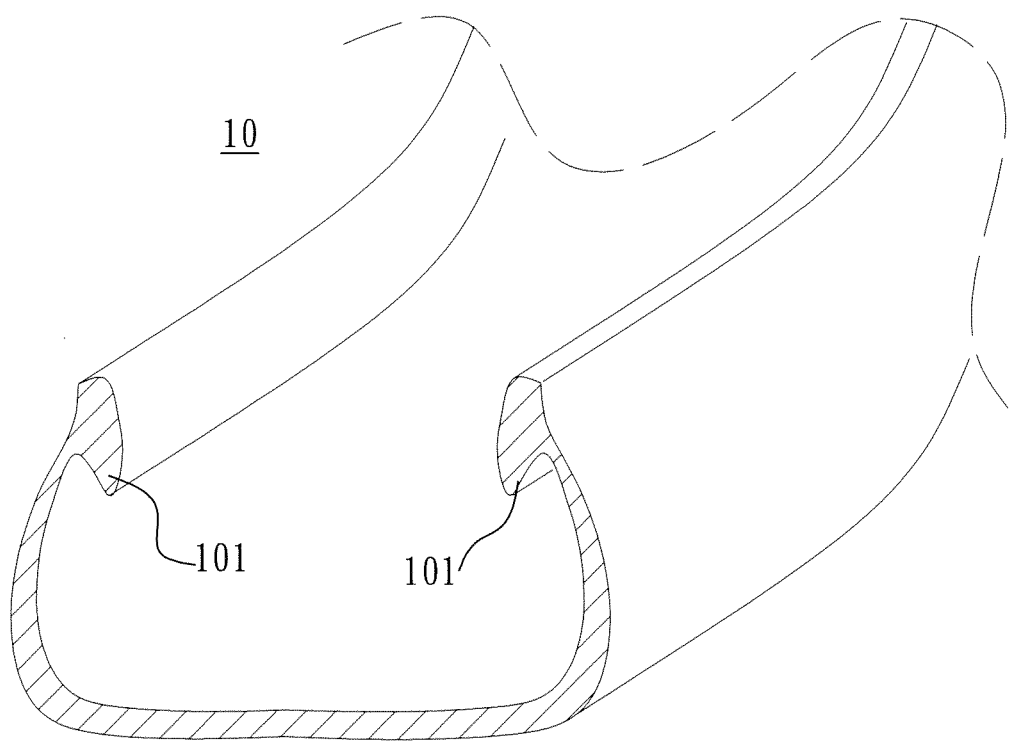
FIG. 1 is a cutaway view of a tire for working with the improved puncture-proof structure for tires of the present invention.

The present invention provides an improved puncture-proof structure for tires. Referring to FIG. 1, a tire 10 has its two top inner edges formed with hooked portions 101 and is reinforced by cords arranged therein.

Figure 2:
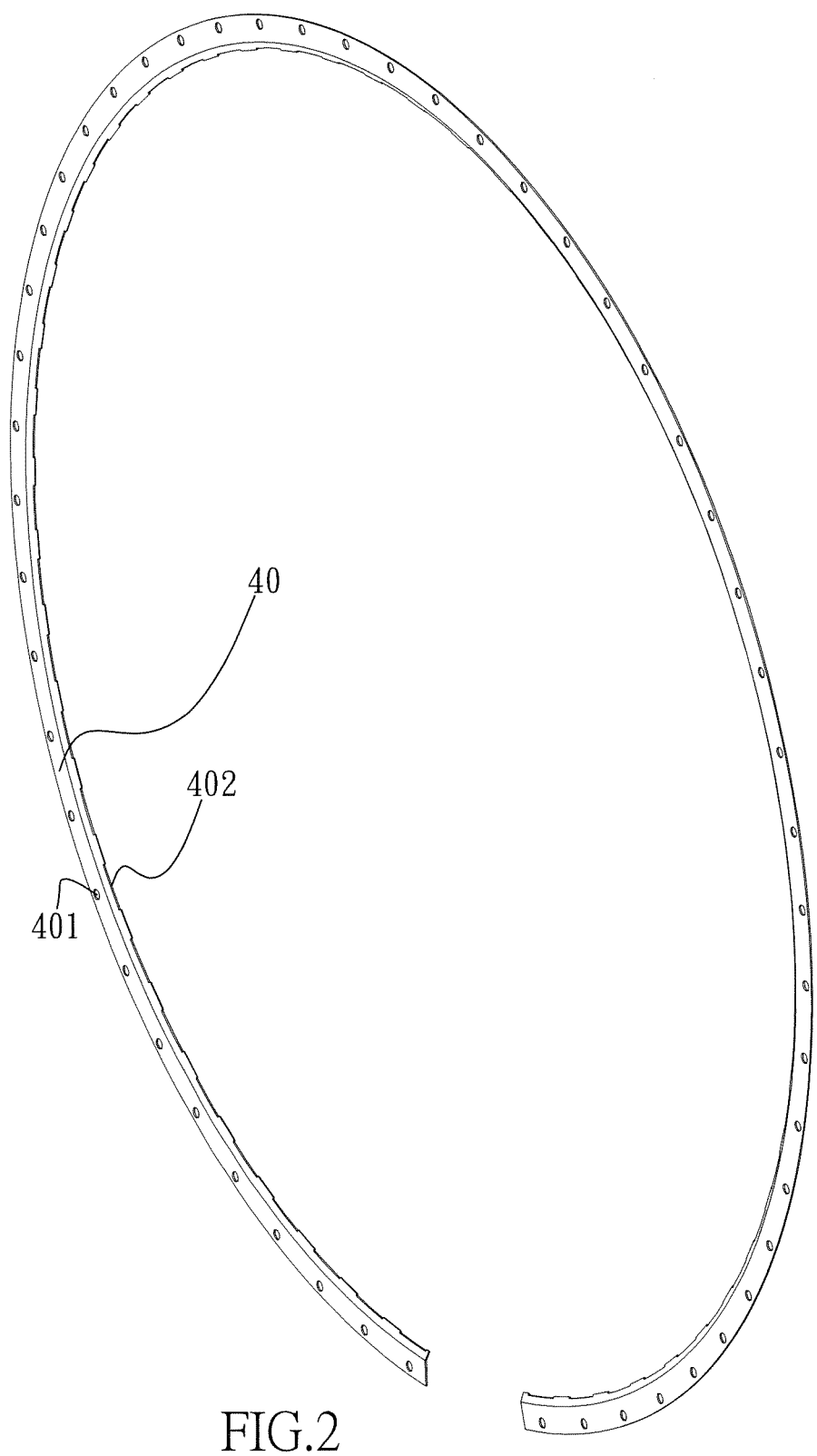
FIG. 2 is a perspective view of a C-shaped holding piece of the improved puncture-proof structure.

Referring to FIG. 2, two C-shaped holding pieces 40 each have a C-shaped body formed with plural through holes 401 and notches 402.

Figure 3:
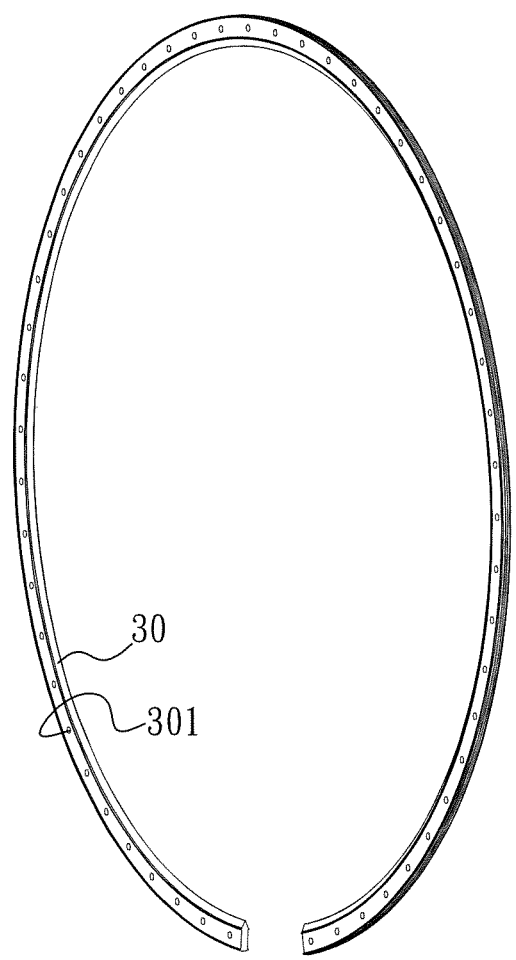
FIG. 3 is a perspective view of a C-shaped lining piece of the improved puncture-proof structure.

Referring to FIG. 3, a C-shaped lining piece 30 has a C-shaped body formed with plural through holes 301.

Figure 8:
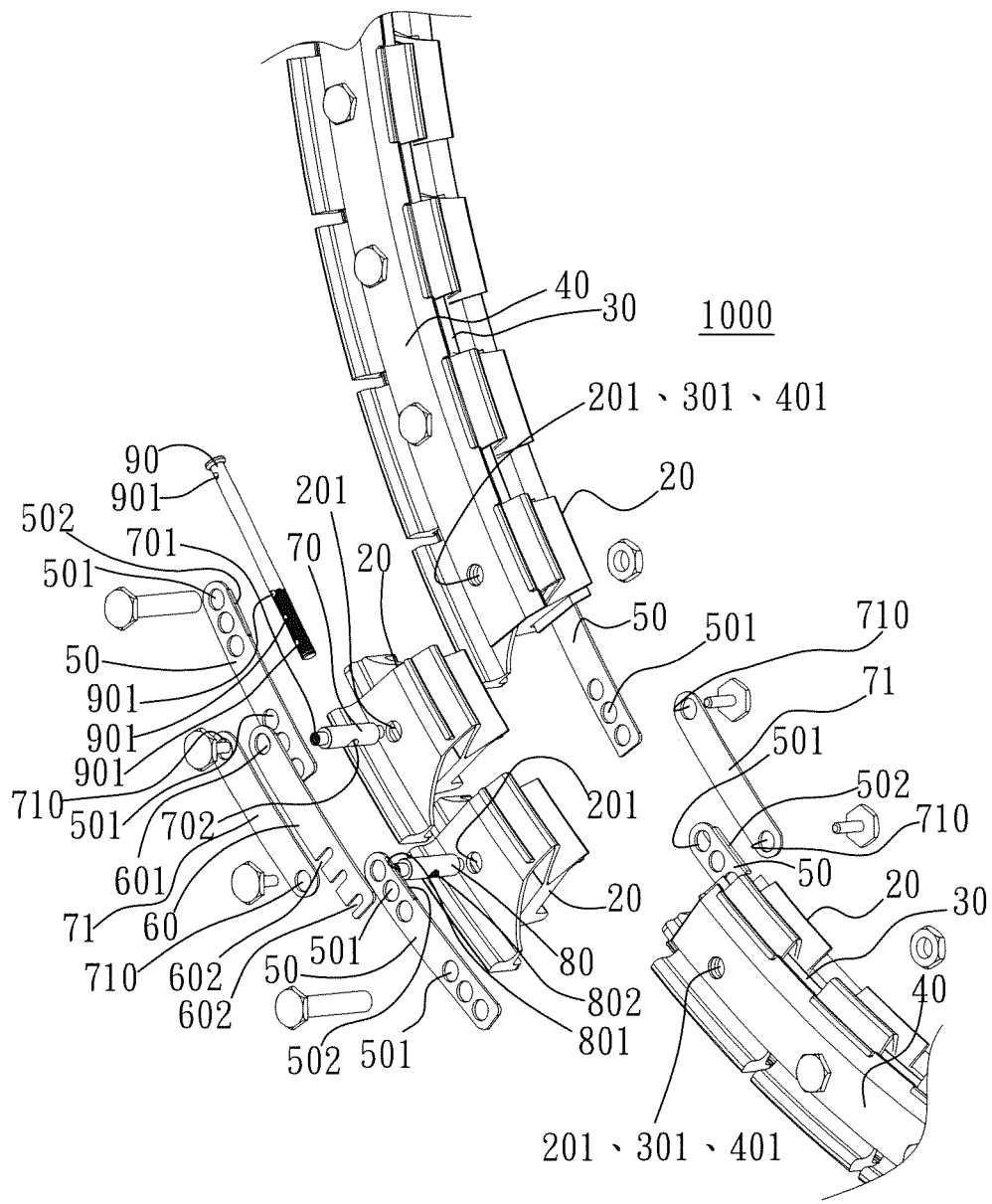
FIG. 8 shows components at two joined ends of the spare tire body formed by the improved puncture-proof structure for tire.

Referring to FIG. 8, a fine tuning member 50 has a lengthwise body formed with plural receiving holes 501, and a propping plate 502 is extended from the upper edge of the fine tuning member 50.

Also referring to FIG. 8, an adjusting member 60 is a lengthwise piece with one end formed with one receiving hole 601 and an opposite end formed with plural indentations 602.

Still referring to FIG. 8, a pressing shaft 70 is an axle that passes through a through hole 201 provided on a combining block 20. The pressing shaft 70 has its two ends formed with threaded holes 701, and has a through hole 702 running radially therethrough.

A pressing bolt 80, as shown in FIG. 8, is an axle that passes through a through hole 201 provided on the combining block 20. The pressing bolt 80 has its two ends formed with threaded holes 801, and has a threaded retaining hole 802 running radially therethrough.

A pressing screw bolt 90, as shown in FIG. 8, is provided with plural positioning holes 901.

A reinforcing plate 71, also shown in FIG. 8, is a lengthwise piece provided with separated locking holes 710. The reinforcing plates 71 may come with different intervals between the locking holes 710 for option in practical use.

Figures 4, 5:
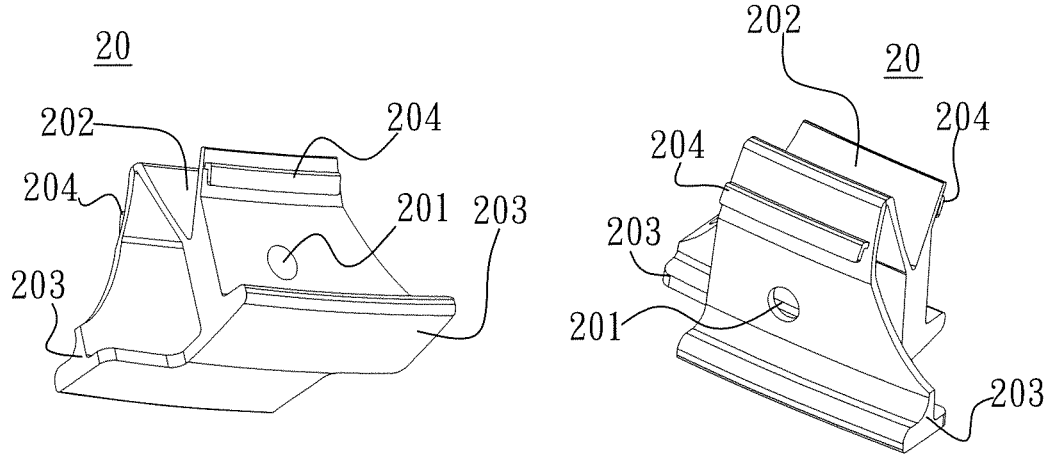
FIG. 4 is a perspective view of a combining block of the improved puncture-proof structure.
FIG. 5 is another perspective view of the combining block of the improved puncture-proof structure.

The combining block 20, as shown in FIG. 4 and FIG. 5, is a hollow member with two lateral sides thereof provided with through holes 201 and with its top formed as an engaging valley 202. The combining block 20 has its two lengthwise ends on its bottom, the lengthwise ends being diagonally formed with projecting portions 203, i.e. the first lengthwise end is formed with a projecting portion 203 on the first lateral side and the second lengthwise end is formed with a projecting portion 203 on the second lateral side. An engaging rib 204 is formed above each of the through holes 201 at the two sides of the combining block 20.

Figure 6:
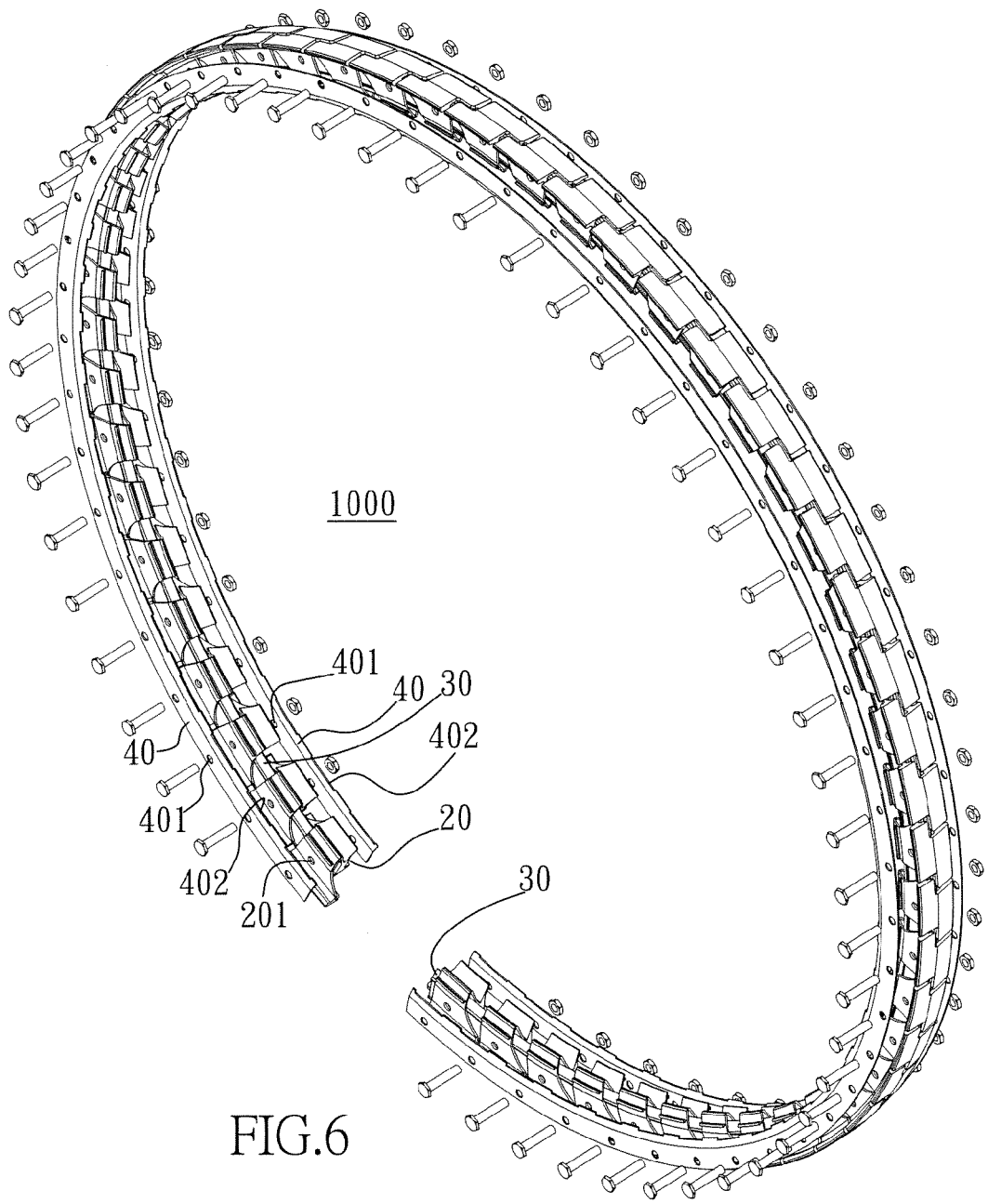
FIG. 6 is a partially exploded view of a spare tire body formed by the improved puncture-proof structure for tire.
Figure 7:
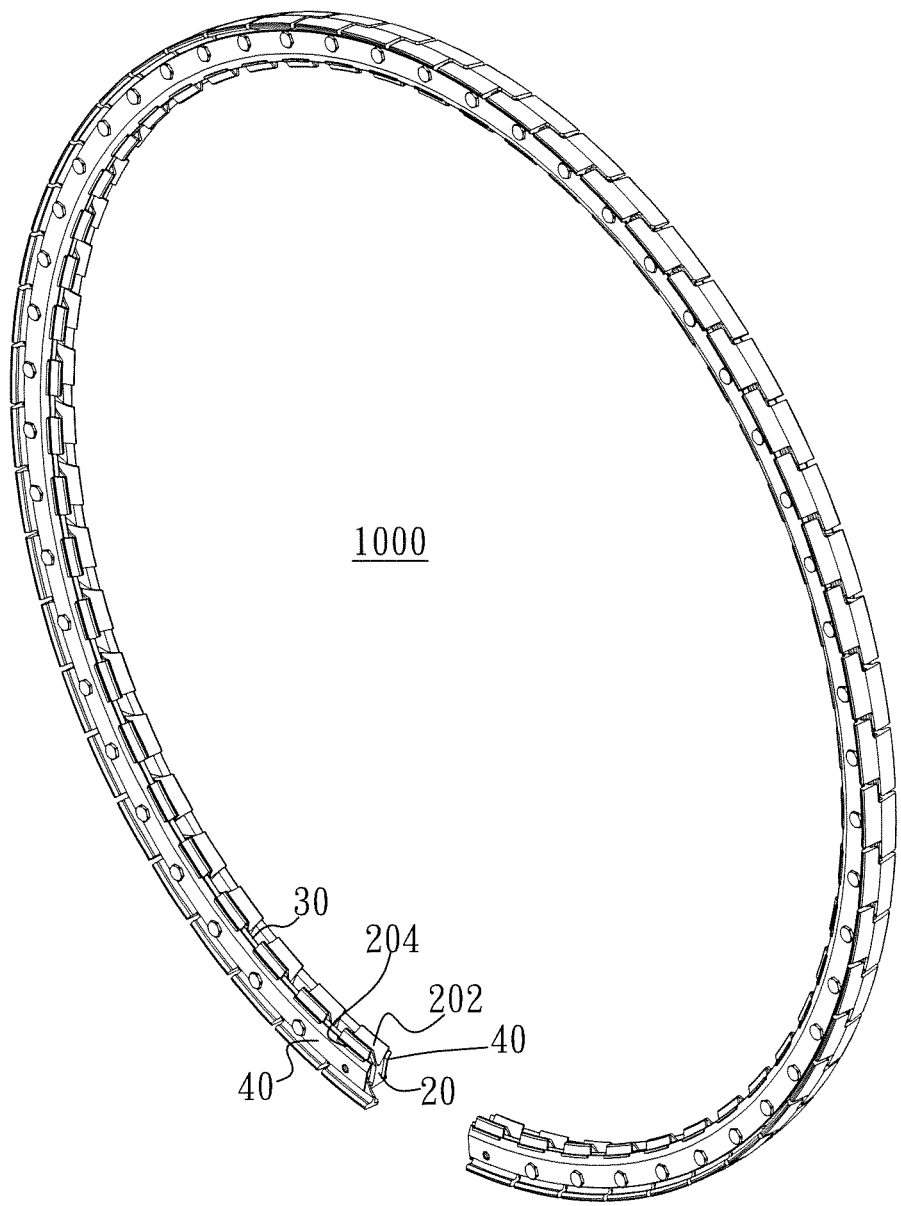
FIG. 7 is a perspective view of the spare tire body formed by the improved puncture-proof structure for tire.

Referring to FIG. 6 and FIG. 7, the C-shaped lining piece 30 is configured to be inserted into the hollow combining blocks 20 so that the through holes 301 of the C-shaped lining piece 30 are aligned with the through holes 201 on the combining blocks 20. The two C-shaped holding piece 40 are such placed that the through holes 401 thereof are aligned with the through holes 201 on the combining blocks 20, so that screw bolts passing through the through holes 301, 401, 201 of the C-shaped lining piece 30, the C-shaped holding pieces 40 and the combining blocks 20 can hold the components together to form a C-shaped spare tire body 1000. At this time, the two engaging ribs 204 provided at the two sides of the combining block 20 are engaged with notches 402 formed on the C-shaped holding pieces 40.

Figure 9:
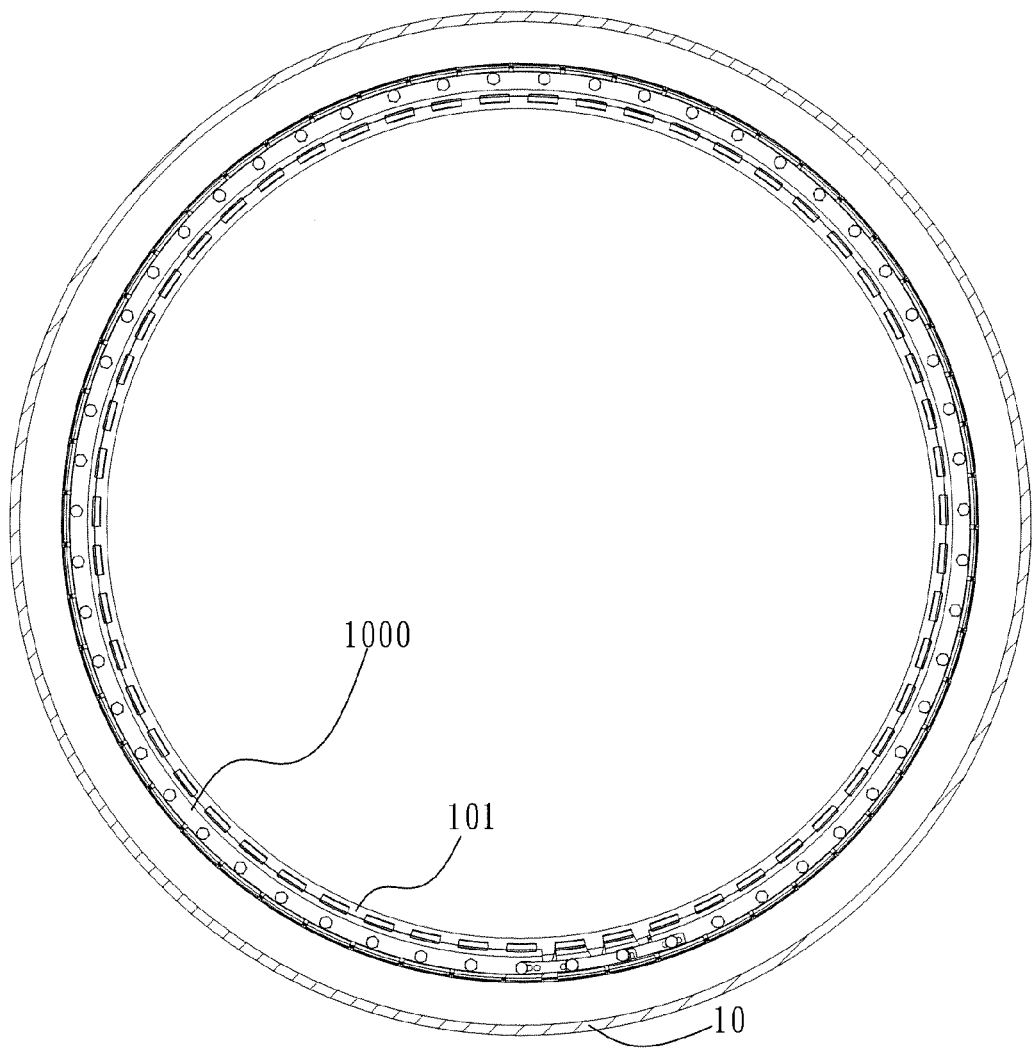
FIG. 9 is a cross-sectional view of a tire having the spare tire body formed by the improved puncture-proof structure engaged with hooked portions of the tire.
Figure 10:
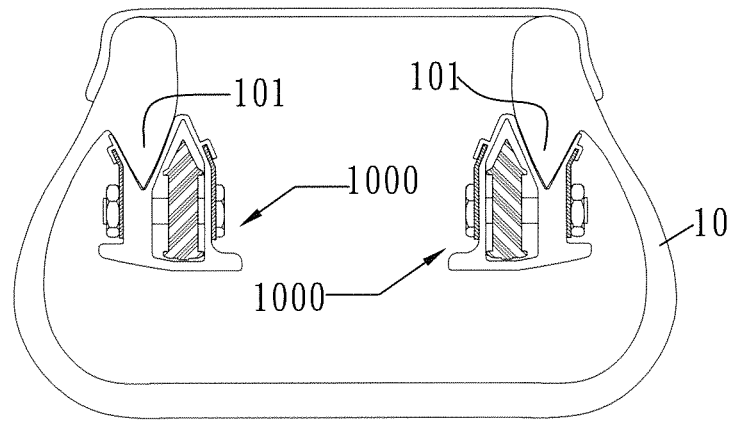
FIG. 10 is another cross-sectional view of the tire having the spare tire body formed by the improved puncture-proof structure engaged with the hooked portions of the tire.

As shown in FIGS. 8, 9 and 10, the combination between the spare tire body 1000 and the tire 10 is, for example, achieved by engaging the engaging valleys 202 of the combining blocks 20 with the hooked portions 101 of the tire 10, and the two combining blocks 20 terminating the spare tire body 1000 have their through holes 201, together with the through holes 401, 301 of the C-shaped holding pieces 40 and the C-shaped lining piece 30, aligned with the receiving holes 501 of the fine tuning members 50 so as to allow screws to pass all the holes and hold all the components together. The fine tuning members 50 connecting two ends of the spare tire body 1000 have their receiving holes 501 each aligned with a threaded hole 701 of the pressing shaft 70 fixedly held by the through hole 201 of one of the combining block 20 or the threaded hole 801 of the pressing bolt 80 fixedly held by the through hole 201 of the other of the combining block 20. The through hole 702 of the pressing shaft 70 receives a pressing screw bolt 90, and the threaded retaining hole 802 of the pressing bolt 80 is configured to screwedly receive the pressing screw bolt 90 passing through the through hole 702 of the pressing shaft 70. By screwing the pressing screw bolt 90 in or out with respect to the threaded retaining hole 802, the spare tire body 1000 can be finely tuned to fittingly engaged with the hooked portions 101 of the tire 10. Also provided is an adjusting member 60, which, together with the two reinforcing plate 71, straddles on the fine tuning members 50 such that the receiving hole 601 and the indentations 602 of the adjusting member 60 and the locking hole 710 of the reinforcing plate 71 are aligned with the receiving holes 501 of the fine tuning members 50. Then screw bolts can be inserted into the threaded holes 701, 801 of the pressing shaft 70 and the pressing bolt 80 to hold these components together. At this time, one of the screw bolts can prop against the positioning hole 901 of the pressing screw bolt 90 to prevent the pressing screw bolt 90 from loosening. Therein, the propping plates 502 of the fine tuning member 50 can prop against the adjusting member 60 to prevent the adjusting member 60 from loosening. When damaged by a sharp article, the tire 10 can still drive the car to a repair work shop by using the spare tire body 1000.

Moreover, the plural receiving holes 501 of the fine tuning member 50 and the plural indentations 602 of the adjusting member 60 provide different combined distances for optional use in order to make the spare tire body 1000 fittingly engaged with the hooked portion 101 of the tire 10.

Figure 12:
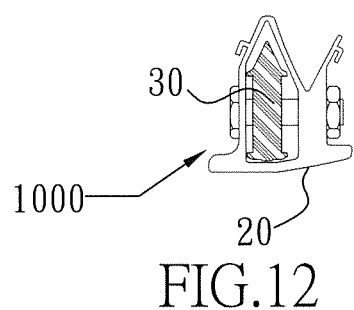
FIG. 12 is a cross-sectional view of a simplified spare tire body formed according to still another embodiment of the improved puncture-proof structure of the present invention.
Figure 11:
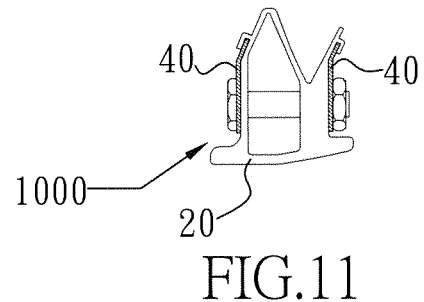
FIG. 11 is a cross-sectional view of a simplified spare tire body formed according to another embodiment of the improved puncture-proof structure of the present invention.
Figure 14:
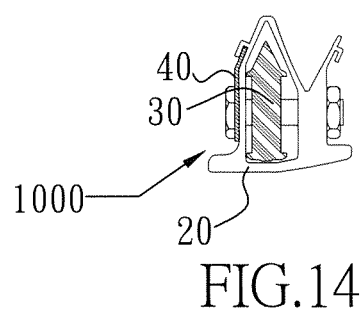
FIG. 13 and FIG. 14 are cross-sectional views of a simplified spare tire body formed according to yet another embodiment of the improved puncture-proof structure of the present invention.
Figure 13:
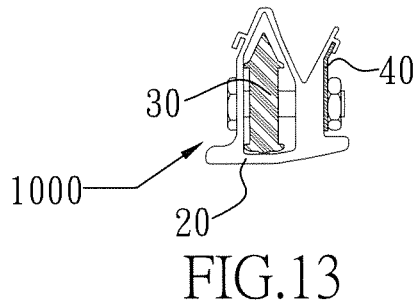

As described above, the spare tire body 1000 is composed of plural combining blocks 20, a C-shaped lining piece 30 and two C-shaped holding pieces 40 held together by screw bolts. However, for its use in tires with different load levels, the spare tire body 1000, as shown in FIG. 12, may be simplified into a combination of plural combining blocks 20 and one C-shaped lining piece 30 that are held together by screw bolts. Alternatively, the spare tire body 1000, as shown in FIG. 13 and FIG. 14, may be simplified into a combination of plural combining blocks 20, one C-shaped holding piece 40, and one C-shaped lining piece 30 held together by screw bolts. In another embodiment, as shown in FIG. 11, the spare tire body 1000 is formed by plural combining blocks 20 and two C-shaped holding pieces 40 held together by screw bolts.

To sum up, the present invention is effective in preventing puncture and ensuring driving safety with simple yet accomplished configuration that requires significantly reduced manufacturing costs and time. As this novel configuration has not been seen in public to date, a patent application is herein made for the same.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A spare tire body for the tire cavity of run-flat tires, the spare tire body comprising:
   a plurality of combining blocks, each combining block being a hollow member that has two lateral sides thereof each provided with a through hole, a bottom thereof, and a top thereof formed as an engaging valley, each combining block having two lengthwise ends thereof located on the bottom, each lengthwise end formed with a projecting portion, the projecting portion of the first lengthwise end being on the first lateral side and the projecting portion of the second lengthwise end being on the second lateral side, each lateral side having an engaging rib formed above its through hole;
   two C-shaped holding pieces each having a C-shaped body formed with plural through holes and notches;
   a C-shaped lining piece having a C-shaped body formed with plural through holes;
      wherein the C-shaped lining piece is inserted into a series of the hollow combining blocks so that the through holes of the C-shaped lining piece are aligned with the through holes of the combining blocks, respectively, and the two C-shaped holding pieces each have the through holes thereof aligned with the through holes at the two sides of the series of the combining blocks, so that screw bolts passing through the through holes of the C-shaped lining piece, the C-shaped holding pieces, and the series of the combining blocks hold together the C-shaped lining piece, the two-C-shaped holding pieces, and the series of the combining blocks to form a C-shaped spare tire body, in which the engaging ribs at the two sides of the series of the combining blocks are fittingly received by the notches of the C-shaped holding pieces;
   the spare tire body further comprising:
   two pairs of fine tuning members, each fine tuning member having a lengthwise body formed with plural receiving holes and a propping plate extended from an upper edge of the lengthwise body;
   an adjusting member being a lengthwise piece that has one end formed with one receiving hole and an opposite end formed with plural indentations;
   a pressing shaft being an axle received in the through holes of a first additional one of the plurality of combining blocks, having two ends thereof formed with threaded holes, and having a through hole running radially therethrough;
   a pressing bolt being an axle passing through the through holes provided on a second additional one of the plurality of combining blocks, having two ends thereof formed with threaded holes, and having a threaded retaining hole running radially therethrough;

a pressing screw bolt being provided with plural positioning holes; and two reinforcing plates each being a lengthwise piece provided with separated locking holes;

wherein the two additional ones of the plurality of combining blocks are positioned between the series combining blocks at the two ends of the C-shaped spare tire body so that all of the engaging valleys are circumferentially aligned, wherein, when the engaging valleys of all of the combining blocks of the spare tire body are engaged with hooked portions of the tire inside the tire cavity, the through holes of the series combining blocks at the two ends of the C-shaped spare tire body and the through holes of the C-shaped holding pieces and of the C-shaped lining piece are aligned with the receiving holes of the two pairs of fine tuning members, one of the respective pair of fine tuning members being on one lateral side of the respective series end combining block and the other one of the respective pair of fine tuning members being on the other lateral side of the respective series end combining block, so that screws pass through these holes and hold together the series end combining blocks, the C-shaped holding piece, the C-shaped lining piece and the fine tuning members, one of the two pairs of the fine tuning members connecting the two additional ones of the plurality of combining blocks with the two ends of the C-shaped spare tire body having the receiving holes thereof each aligned with a threaded hole of the pressing shaft fixedly held by the through holes of the first additional one of the plurality of combining blocks and the other of the two pairs of the fine tuning members connecting the two additional ones of the plurality of combining blocks with the two ends of the C-shaped spare tire body having the receiving holes thereof each aligned with a threaded hole of the pressing bolt fixedly held by the through holes of the second additional one of the plurality of combining blocks, the through hole of the pressing shaft receiving the pressing screw bolt, and the threaded retaining hole of the pressing bolt screwedly receiving the pressing screw bolt passing through the through hole of the pressing shaft, so that by screwing the pressing screw bolt in or out with respect to the threaded retaining hole, the spare tire body is finely tuned to be fittingly engaged with the hooked portions of the tire, the adjusting member and the two reinforcing plates straddling on the fine tuning members such that the receiving hole and the indentations of the adjusting member and the locking holes of the reinforcing plates are aligned with the receiving holes of the fine tuning members, screw bolts being inserted into the threaded holes of the pressing shaft and the pressing bolt to hold together the adjusting member, the two reinforcing plates and the fine tuning members, so that one of the screw bolts props against one of the positioning holes of the pressing screw bolt to prevent the pressing screw bolt from loosening and the propping plates of the fine tuning members adjacent to the adjusting member prop against the adjusting member to prevent the adjusting member from loosening, the plural receiving holes of the fine tuning members and the plural indentations of the adjusting member providing different combined distances for optional use in order to make the spare tire body fittingly engaged with the hooked portion of the tire.

\* \* \* \* \*